(12) United States Patent
Cota-Robles

(10) Patent No.: US 6,490,676 B1
(45) Date of Patent: Dec. 3, 2002

(54) METHOD AND APPARATUS FOR PROTECTING AGAINST FAILURES DUE TO DATA UNAVAILABILITY IN REAL-TIME DATA PROCESSING

(75) Inventor: Erik C. Cota-Robles, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/364,006

(22) Filed: Jul. 29, 1999

(51) Int. Cl.$^7$ .................. G06F 13/40; G06F 13/14
(52) U.S. Cl. .................. 712/225; 710/52; 710/55
(58) Field of Search .................. 714/15, 50, 16, 714/51, 18, 742, 20, 748, 21, 28, 30, 38, 39, 45, 49; 375/222, 338, 346; 711/160, 162, 153, 154, 156, 169, 148; 709/237, 236, 228, 234, 232, 233, 235, 211, 229; 710/129, 32, 1, 105, 39, 109, 17, 52, 33, 35, 52.55; 713/323; 712/36, 38, 42, 29, 30, 31, 201, 202, 227, 217, 225

(56) References Cited

U.S. PATENT DOCUMENTS 4,597,082 A * 6/1986 Hill et al. .................. 714/748
5,721,830 A   2/1998 Yeh et al. .................. 709/237

\* cited by examiner

*Primary Examiner*—Daniel H. Pan
(74) *Attorney, Agent, or Firm*—Blakely Sokoloff Taylor & Zafman LLP

(57) ABSTRACT

The present invention protects against failures due to data unavailability in real-time data processing. The last state of data stored in an output buffer is computed, and a pointer is updated based on the last state of the data stored in the output buffer to point to a starting location of a buffer storing spurious data. In one embodiment, if the data stored in the output buffer is entirely consumed in real-time before new data is written, the pointer is used to begin consuming the spurious data in real-time.

26 Claims, 6 Drawing Sheets

METHOD AND APPARATUS FOR PROTECTING AGAINST FAILURES DUE TO DATA UNAVAILABILITY IN REAL-TIME DATA PROCESSING

FIELD OF THE INVENTION

The present invention pertains to the field of real-time data processing. More particularly, this invention relates to protecting against failures due to data unavailability in real-time data processing.

BACKGROUND OF THE INVENTION

Real-time data processing is data processing that relies on data being available at particular times. For instance, most modems process data in real-time, meaning that data is transmitted and received at a particular frequency or rate. If data is not available when it is expected or needed, the unavailability can cause failures. For instance, a transmitting modem may "stall" if data is not available to be transmitted. A stalled transmitting modem may also cause a receiving modem to become confused or assume that the transmitting modem has terminated the connection.

Failures may substantially impact performance. For instance, re-establishing proper communications between modems can take several seconds. The modems may have to "retrain," taking time to establish a transfer rate, an encoding/decoding protocol, an error checking protocol, etc. With data transmission rates on the order of thousands or even millions of bits per second, wasting several seconds to re-establish communications is very costly in terms of performance.

Failures due to data unavailability are particularly problematic when real-time data processing relies on data from a non-real-time source as opposed to a real-time source. For instance, a conventional hardware modem relies on a real-time source in that it uses dedicated hardware to generate data in real-time. A software or host-based modem, in contrast, relies on a non-real-time source in that it relies on a host processor to generate data. Many host processors do not operate in real-time. That is, the processing power of a host processor may be shared and arbitrated among many different simultaneous processes. The amount of time that any one process waits to be serviced may vary depending upon factors such as the number and type of processes vying to be serviced. Since service time is variable, data may not be available when it is needed for real-time processing.

Non-real-time data sources, however, often provide less expensive hardware solutions for real-time processing. For instance, a conventional hardware modem requires more hardware, and consequently has a higher price point, than a software modem. In order for non-real-time solutions to be viable data sources for real-time processing, the consequences of failures due to data unavailability must be kept to within acceptable limits.

Host processors commonly used for non-real-time data sources tend to be much more powerful than dedicated hardware. For instance, host processors used by software modems can generate a block of data in a short burst of processing time and store the data in a buffer. Then the data can be read from the buffer in real-time while the host processor performs other processing. As long as the host processor returns to the software modem process to generate more data before the buffered data is entirely consumed, the non-real-time data generation by the host processor will not cause failures due to data unavailability.

Various techniques have been used to increase the likelihood that buffered data is available for real-time use. For instance, the size of the buffer can be increased. Increasing buffer size, however, has the obvious disadvantages of using larger amounts of limited storage resources and requiring more processing time to generate one buffer of data.

Another approach modifies the host system to make interrupt requests from a real-time process non-pre-emptible. Essentially, this approach forces the host system to be a real-time data source, and is impractical in many host systems. Making certain interrupts non-pre-emptible may require modifications to the operating system or even modifications to the hardware. These extensive modifications tend to eliminate any cost advantage afforded by using a host system as a data source.

In another approach, as discussed in U.S. Pat. No. 5,721,830 issued to Yeh et al., data can be stored in a circular buffer so that if new data is not available on time, old data can be reused. This type of approach is only applicable where re-using old data is preferable to no data at all.

Therefore, an improved method and apparatus for protecting against failures due to data unavailability in real-time data processing is needed.

SUMMARY OF THE INVENTION

The present invention protects against failures due to data unavailability in real-time data processing. The last state of data stored in an output buffer is computed, and a pointer is updated based on the last state of the data stored in the output buffer to point to a starting location of a buffer storing spurious data. In one embodiment, if the data stored in the output buffer is entirely consumed in real-time before new data is written, the pointer is used to begin consuming the spurious data in real-time.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention protects against failures due to data unavailability in real-time data processing. In general, if data is not available for real-time processing, the present invention uses a pointer to allow real-time processing to continue by directing the processing to spurious data. Various embodiments and examples are discussed more fully below.

Figure 1:
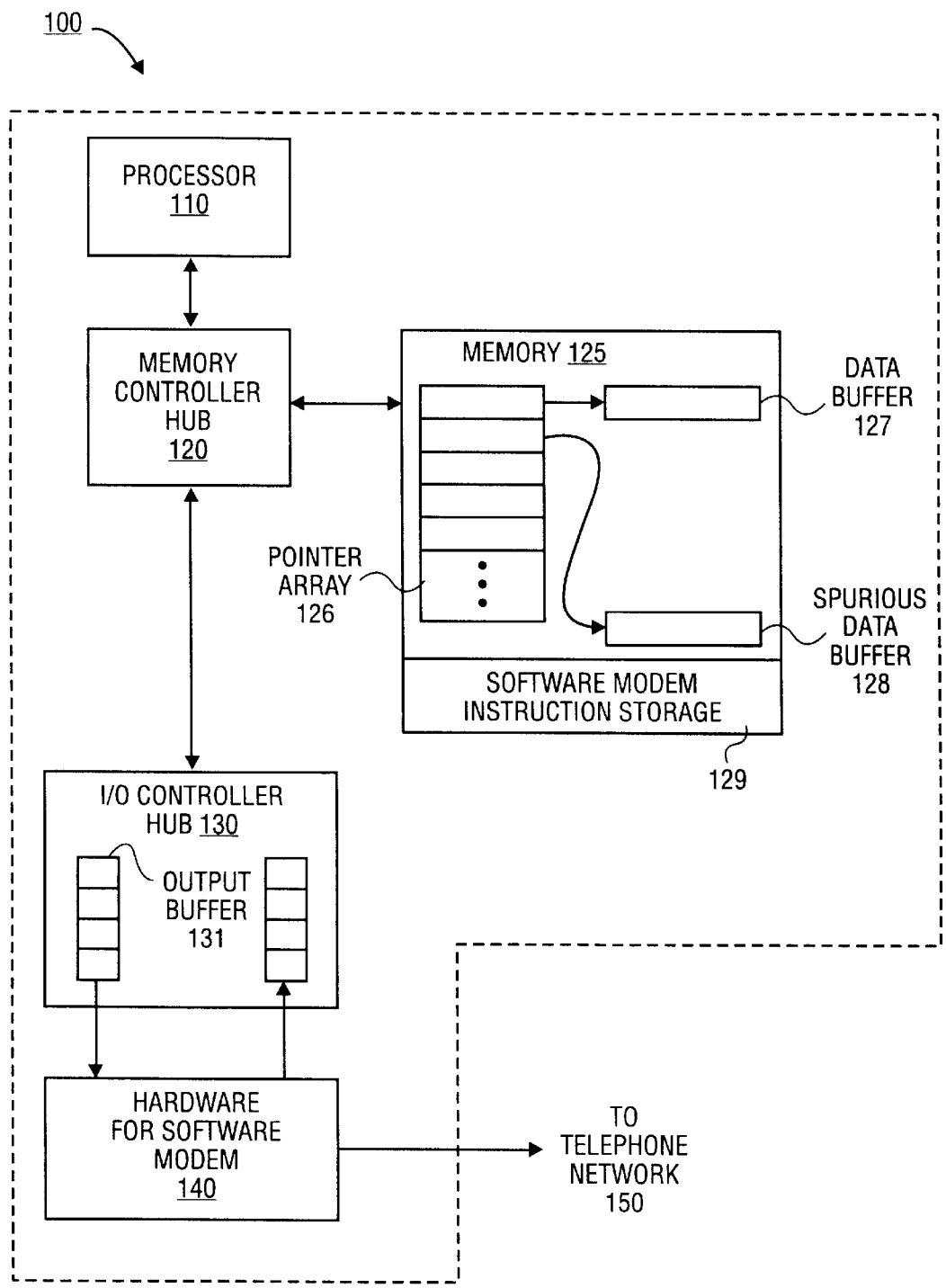
FIG. 1 illustrates one embodiment of the present invention in a computer system

FIG. 1 illustrates one embodiment of a situation in which real-time data processing is dependent upon a non-real-time data source. As discussed above, failures due to data unavailability are especially problematic when real-time data processing is dependent upon a non-real-time data source. In the illustrated embodiment, processor 110, memory controller hub 120, memory 125, input/output (I/O) controller hub 130, and hardware for a software modem 140 are coupled as shown. In alternate embodiments, any of a broad category of computer systems can be used in place of system 100.

A software modem includes hardware 140 and instructions 129 stored in memory 125. Instructions 129 are read from memory 125 and executed by processor 110. According to the teachings of the present invention, processor 110 generates data to be transmitted by the software modem and stores the data in buffers, such as data buffer 127, in memory 125. When processor 110 writes a buffer of data to memory 125, processor 110 also updates pointer array 126.

As discussed more fully below, pointer array 126 comprises a list of pointers that point to buffers of data in the order in which the data buffers are to be read. When processor 110 updates a pointer in pointer array 126 to point to the most recently generated buffer of data, processor 110 also updates the next pointer in the array to point to spurious data buffer 128. In various embodiments, as discussed below, spurious data buffer 128 contains some form of pre-computed data. In alternate embodiments, as discussed below, several spurious data buffers may be used in various situations and combinations.

Hardware 140 couples to another modem (not shown) through telephone network 150. Hardware 140 includes hardware necessary for interfacing with telephone network 150, such as a digital to analog converter, a connector to plug into a telephone wall outlet, etc.

Most modem connections are fall duplex connections. A fall duplex connection is one in which data is sent and received simultaneously, similar to a voice conversation over a telephone network in which a participant can speak and listen simultaneously. Even if one participant, or modem, is not speaking, or not sending meaningful data, the line is still open and data is still being sent and received.

Modem connections are also synchronous, which means that modems at each end of a connection have equal clocks so that data is sent and received from each end at equal rates or frequencies.

A synchronous, fall duplex modem connection requires data to be available in real-time. That is, the software modem of FIG. 1 sends data at a constant rate throughout the duration of a modem connection. Even if the software modem has no meaningful data to send, and even if the software modem is simultaneously receiving information from the other modem, the software modem continues to send data at a constant rate. If data is not available for the software modem to send, any number of failures may occur potentially requiring several seconds to reestablish proper communications.

In the embodiment illustrated in FIG. 1, hardware 140 reads samples of data from output buffer 131 of I/O controller hub 130 at a constant rate. I/O controller hub 130 fills output buffer 131 with new samples of data as samples of data are consumed. Using direct memory accesses to memory 125, I/O controller hub 130 reads a pointer from array 126 and retrieves samples of data from the data buffer indicated by the pointer. When the last sample in the indicated data buffer is consumed, I/O controller hub 130 reads the next pointer from array 126 and begins retrieving samples of data from the next indicated buffer.

As long as processor 110 writes new data buffers and updates pointer array 126 before I/O controller hub 130 consumes the last sample of data in the previous data buffer, the spurious data will not be used. If, however, processor 110 is busy with other processing and does not write a new buffer to memory 125 in time, I/O controller hub 130 will read a pointer to spurious data buffer 128 and begin retrieving spurious data.

In one embodiment, spurious data comprises HDLC (high-level data link control) flags indicating that no data is being sent. During normal modem operation, a large portion of the waveform sent by a modem may be HDLC flags indicating no data. For instance, while a large file is being received, there may be no meaningful data that needs to be sent. In which case, from the perspective of the receiving modem, the stream of no data flags read from the spurious data buffer appears perfectly natural.

In another embodiment, spurious data may be all zeros or all ones. Even though the data may appear meaningless to the receiving modem, modems are accustom to receiving data that appears meaningless. This is because data is routinely disrupted during normal modem communications. For instance, line noise such as static and echoes, especially in cellular phone connections but also in wired connections, often corrupt data. To a receiving modem, spurious data may be indistinguishable from routine line noise. Any number of techniques can be used to recover from line noise or spurious data. Various other forms of spurious data can be used in alternate embodiments.

Consuming spurious data from spurious data buffer 128 requires a certain amount of time. The time it takes to consume the spurious data gives processor 110 that much more time to generate a new buffer of data and update pointer array 126. In many circumstances, such as modem communications, spending some time pre-computing spurious data, and occasionally consuming spurious data, is often preferable to the consequences of having no data available. Using spurious data gives a non-real-time data source an opportunity to catch up to real-time processing. For instance, spending a few milliseconds to consume spurious data is preferable to spending several seconds to re-establish and retrain proper modem communications.

Those skilled in the art will recognize that the present invention is applicable to a wide variety of real-time processes. For instance, the present invention is applicable to a software based digital subscriber line (DSL), integrated services digital network (ISDN), Ethernet, token ring, as well as "non-modem" type applications.

Figure 2:
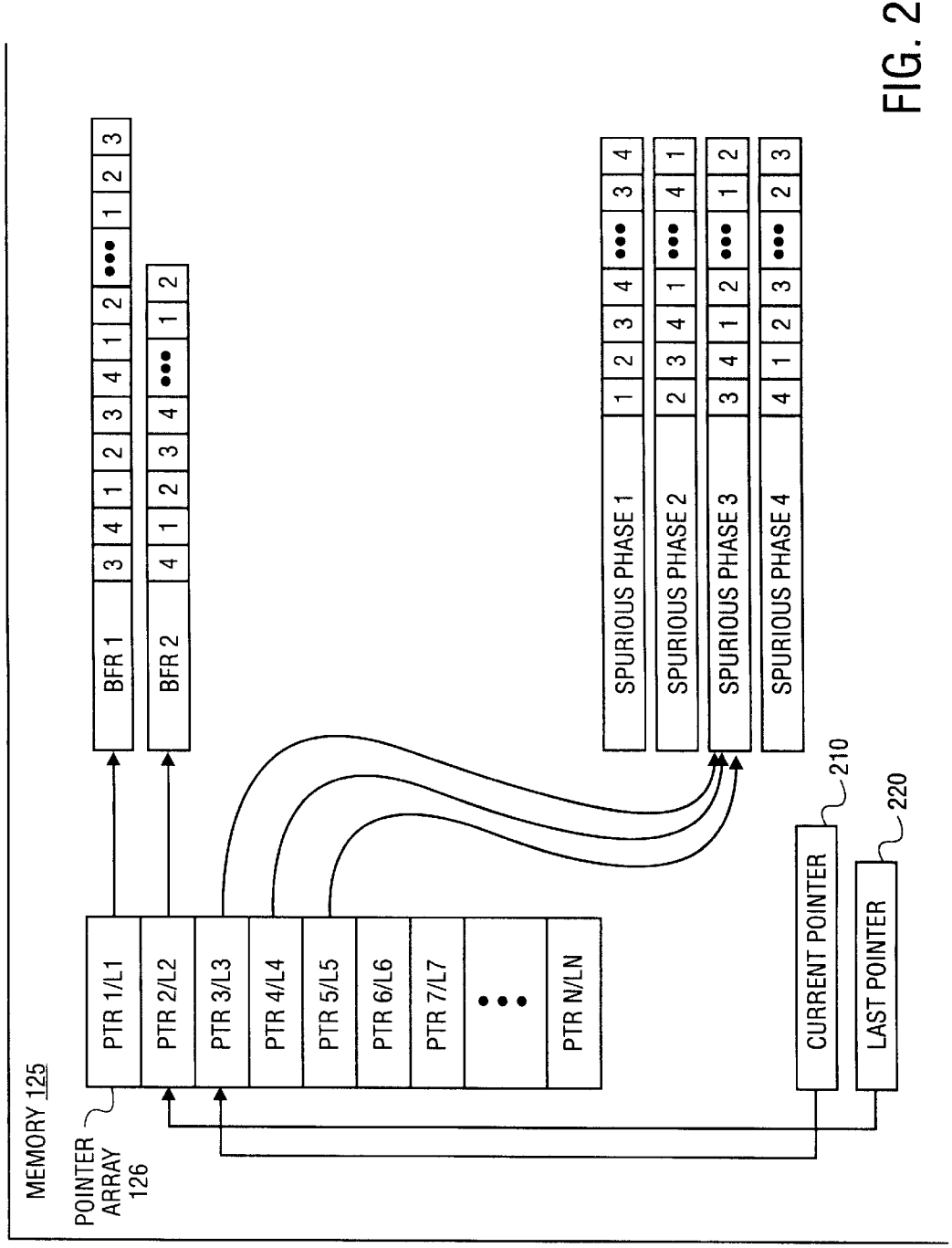
FIG. 2 illustrates one embodiment of a memory structure according to the teachings of the present invention.

FIG. 2 illustrates one embodiment of memory 125 in greater detail. As illustrated in FIG. 2, data samples are stored in data buffers as part of a software modem. As with many modems, a multi-phased encoding technique is used. Multi-phased encoding requires modems at both ends of a communication channel to be "in phase." That is, if a sending modem encodes a data sample using phase one of a multi-phase encoding cycle, then the receiving modem must decode the data sample using phase one of the cycle in order for the data to be recoverable. Those skilled in the art will be familiar with a wide variety of multi-phased encoding techniques, and the various advantages and applications of each.

Modems stay in phase because they are synchronous. That is, as discussed above, modems use an equal clock. When communications are established, the modems agree on a multi-phase encoding cycle and a clock rate. The modems start communications in the same phase of the encoding cycle and then change phases at a constant rate based on the equal clock rate. As long as both modems continue to send data at a constant rate, the modems will remain in phase.

If data is not available on time, any number of errors may occur. For instance, if one modem stalls for one or more phases of the encoding cycle because data is not available on time, the other modem is likely to move on to the next phase of the cycle so that the modems become out of phase. All of the data that is decoded after the modems become out of phase will be useless, or "garbage," data because the data will be encoded and decoded in different phases of the cycle. The modems may continue decoding garbage data for a relatively long period of time before the modems detect and correct the error. All of the data may need to be resent, severely impacting performance.

Figure 6:
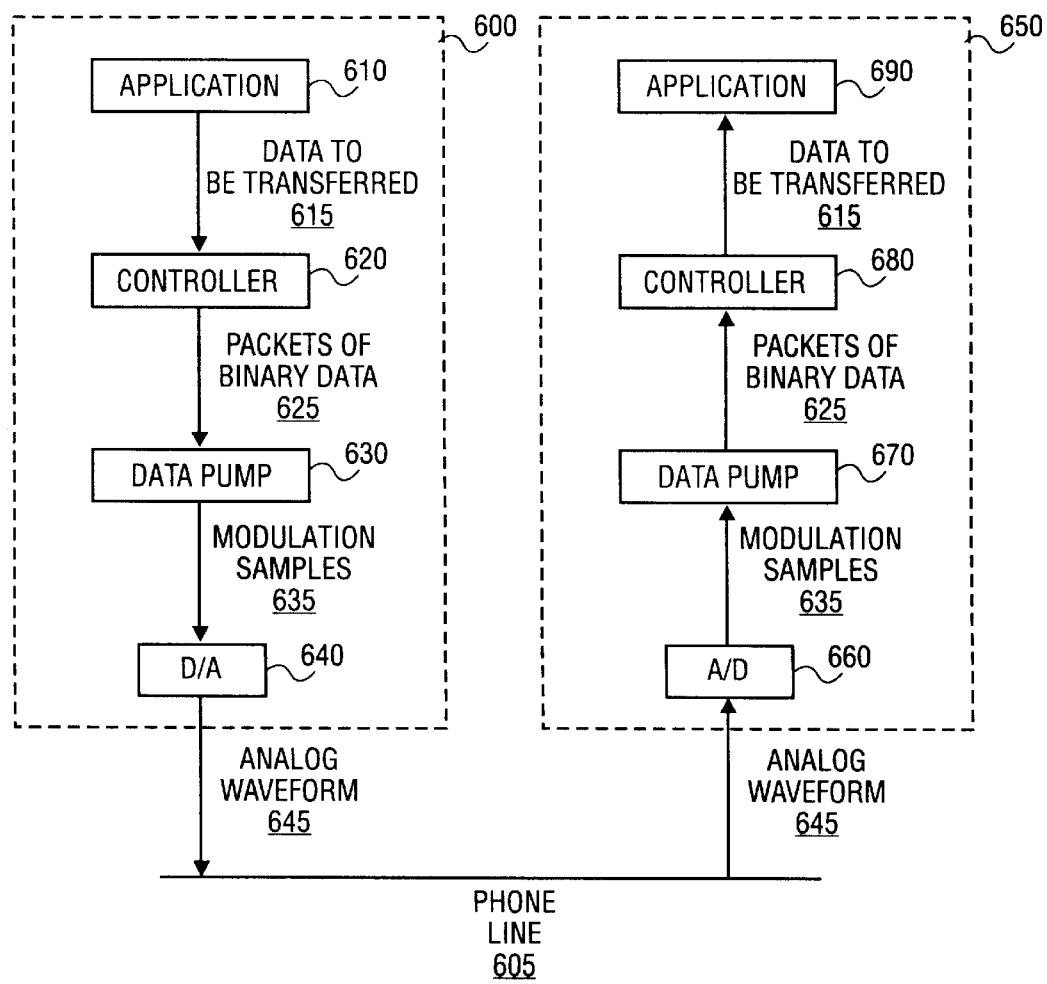
FIG. 6 illustrates one embodiment of a transmitting software modem and a receiving software modem.

The delay between an out-of-phase error and detection of the error is generally due to the point at which error detection takes place. For instance, skipping briefly to FIG. 6, FIG. 6 illustrates one embodiment of a data transmission from one system 600 to another system 650 using software modems. An application 610 generates data to be transferred 615. Controller 620 packetizes the data and provides the packets of binary data 625 to datapump 630. Datapump 630 generates modulation samples 635 using the multi-phased encoding cycle. Application 610, controller 620, and datapump 630 are all executed in software by, for instance, processor 110 of FIG. 1. Modulation samples 635, according to the teachings of the present invention are stored in memory, such as memory 125 of FIG. 1, and converted into an analog waveform 645 in real-time by digital-to-analog (D/A) converter 640. Analog waveform 645 travels over phone line 605 to analog-to-digital (A/D) converter 660. A/D converter 660 recovers the modulation samples 635, datapump 670 recovers the packets of data 625 using the multi-phased decoding cycle, and controller 680 recovers the data received 615 and provides the data to application 690. In general, an out-of-phase error will not be noticed until the data reaches controller 680. Any data in the "pipeline" between application 610 and controller 680 between the time of the error and the time the error is detected and corrected will likely be garbage data.

Returning to FIG. 2, the present invention in the illustrated embodiment is intended to reduce the likelihood of errors due to data unavailability in a four-phase encoding cycle. In FIG. 2, pointer array 126 can store up to N pointers, pointers PTR 1 to PTR N. PTR 1 points to a data buffer BFR 1. The first modulation sample in BFR 1 is encoded in phase three of the encoding cycle. Each subsequent modulation sample is encoded in the next phase in the encoding cycle; specifically a phase four modulation sample, followed by a phase one modulation sample, followed by a phase two modulation sample, and so on. The last modulation sample in BFR 1 is a phase three modulation sample. In which case, the first modulation sample in the next data buffer must be encoded in phase four, as shown for the first modulation sample in BFR 2.

As discussed above with reference to FIG. 6, each modulation sample 635 is rendered by D/A converter 640 into an analog waveform 645 which is transmitted over phone line 605 to the receiving system 650.

In the embodiment illustrated in FIG. 2, the most recently generated data buffer is BFR 2. PTR 2 has been updated in pointer array 126 to point to BFR 2. The next three pointers, PTR 3, PTR 4, and PTR 5, have been updated to point to a spurious data buffer, SPURIOUS PHASE 3. That is, in the illustrated embodiment, four spurious data buffers have been pre-computed; one spurious data buffer corresponding to each phase of the four phase encoding cycle. When processor 110 updates pointer array 126, processor 110 also determines the phase of the last modulation sample in the most recently generated data buffer and updates the entries in pointer array 126 to point to the spurious data buffer that begins with a modulation sample in the next phase of the cycle. In the illustrated embodiment, BFR 2 ends with a phase two modulation sample, so PTR 3, PTR 4, and PTR 5 are all updated to point to the spurious data buffer beginning with a phase three modulation sample, SPURIOUS PHASE 3. SPURIOUS PHASE 3 ends with a modulation sample of the same phase as BFR 2 so as to maintain phase with the next data buffer to be generated.

If processor 110 does not generate the next buffer of data before BFR 2 is consumed, I/O controller hub 130 will begin reading spurious data from SPURIOUS PHASE 3. Each spurious data buffer may take, for instance, three milliseconds to consume. In which case, with three spurious data buffers, processor 110 has up to 9 additional milliseconds to generate the next buffer of data and update pointer array 126. As little as three milliseconds of spurious data may be read if, for instance, processor 110 generates a new buffer of data and updates pointer array 126 before I/O controller hub 130 reads PTR 4.

In the illustrated embodiment, processor 110 uses two buffers, CURRENT POINTER 210 and LAST POINTER 220, to determine where to update pointer array 126. When processor 110 writes a new buffer of data and updates pointer array 126, processor 110 also stores the address of the pointer that was just updated in LAST POINTER 220. When I/O controller hub 130 reads a pointer from pointer array 126, I/O controller hub 130 stores the address of the pointer to CURRENT POINTER 210. When processor 110 returns to write the next new buffer of data, processor 110 checks both buffers, LAST POINTER 220 and CURRENT POINTER 210, and updates the next pointer in pointer array 126 following the latter of LAST POINTER 220 or CURRENT POINTER 210.

For example, in the illustrated embodiment, BFR 2 is the last data buffer so LAST POINTER 220 indicates PTR 2. I/O controller hub 130 is reading the first spurious data buffer indicated by PTR 3, so CURRENT POINTER 210 indicates PTR 3. If processor 110 writes a new data buffer before I/O controller hub 130 moves on to the next spurious data buffer indicated by PTR 4, processor 110 will update pointer array 126 starting with PTR 4.

In alternate embodiments, processor 110 may update more or fewer pointers to point to one or more spurious data buffers. Also in alternate embodiments, any number of techniques can be used to determine which pointer in pointer array 126 should be updated when a new buffer of data is written.

In the illustrated embodiment, each pointer, PTR 1 to PTR N, has stored with it a length of the corresponding data buffer, L1 to LN. When processor 110 writes a new data buffer, processor 110 updates the next pointer in array 126 to point to the starting address of the new data buffer and updates the length of the new data buffer. When I/O controller hub 130 reads the starting address and the length from pointer array 126, I/O controller hub 130 starts reading modulation samples beginning with the starting address, accumulates the length of the modulation samples as they are read, and compares the accumulated length to the length of the data buffer. When the accumulated length equals the length of the data buffer, I/O controller hub 130 begins reading the next data buffer indicated by the next pointer entry in pointer array 126.

In an alternate embodiment, processor 110 writes data buffers of fixed length and I/O controller hub 130 is programmed to read the fixed length for each data buffer so that a length indicator is not needed in pointer array 126. In another embodiment, processor 110 stores a pointer to a starting address and an ending address for a new data buffer in pointer array 126. In which case, I/O controller hub 130 starts reading at the starting address and recognizes the end of the buffer based on the ending address. Any number of additional techniques can be used to identify the start and end of data buffers.

In one embodiment, I/O controller hub 130 is programmed with an address range for pointer array 126 in memory 125, and pointer array 126 is logically a circular buffer. In which case, I/O controller hub 130 uses direct memory accesses to read pointers from pointer array 126 as data buffers are consumed. When the last pointer in pointer array 126 is reached, I/O controller hub 130 automatically returns to the first pointer in pointer array 126.

Alternately, I/O controller hub 130 may issue interrupt requests to processor 110 to request a new pointer. In which case, processor 110 provides pointers to I/O controller hub 130, and I/O controller hub 130 only performs direct memory accesses to read data from the buffers indicated by the pointers. Any number of additional techniques could be used to provide pointers to I/O controller hub 130 from pointer array 126.

Figure 3:
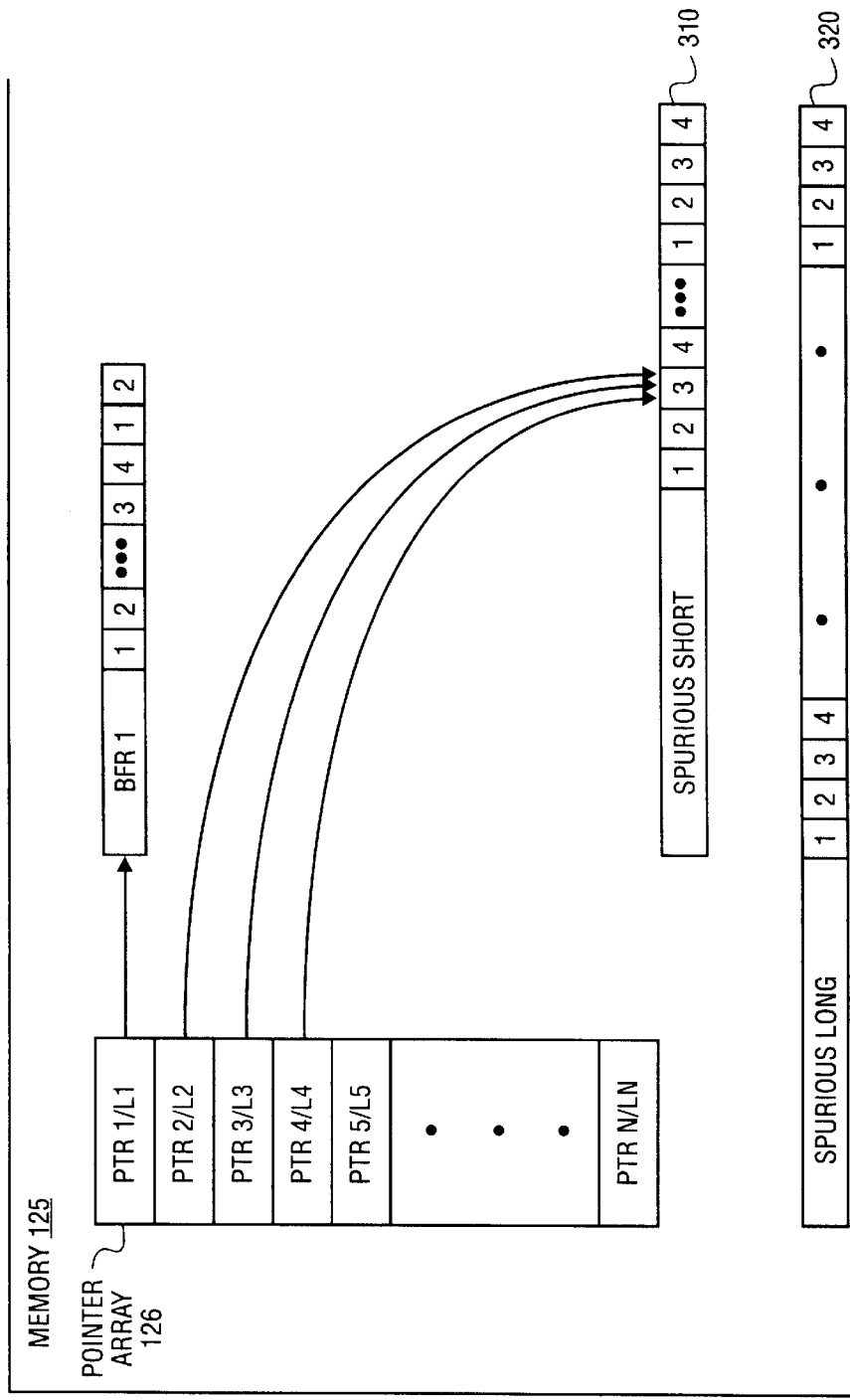
FIG. 3 illustrates another embodiment of a memory structure according to the teachings of the present invention.

FIG. 3 illustrates another embodiment of memory 125. In the illustrated embodiment, rather than having separate spurious buffers for each phase of the encoding cycle, only one spurious buffer is needed. When processor 110 writes a buffer of data, processor 110 determines the phase of the last modulation sample in the data buffer as well as the address of the first modulation sample in the spurious buffer that is next in the encoding cycle. For instance, BFR 1 ends with a phase two modulation sample. So, processor 110 updates the next pointer in pointer array 126, PTR 2, to point to the address of the first phase three modulation sample in spurious buffer 310. In the illustrated embodiment, processor 110 also determines a length, L2, of spurious buffer 310 so that the buffer will end on the last phase two spurious sample so as to maintain phase with the next data buffer to be generated. Any number of techniques can be used to quickly update pointer array 126 with the appropriate pointers to beginning and ending addresses in spurious data buffer 310 including, for instance, a lookup table (not shown) indicating which pointer and length combinations correspond to a particular phase of a last modulation sample.

FIG. 3 also illustrates a long spurious data buffer 320. For instance, the short spurious data buffer 310 may take 4 milliseconds to consume for each iteration that it is read and the long spurious data buffer 320 may take 15 milliseconds to consume. In which case, spurious data may be read for up to 27 milliseconds or as short as 4 milliseconds.

Any number of combinations of one or more spurious data buffers, such as those illustrated in FIGS. 2 and 3, can be used to give a non-real-time data source, such as processor 110, an additional margin of time to generate data for real-time data processing, potentially reducing the impact on performance due to data unavailability errors, such as out-of-phase errors.

Figure 4:
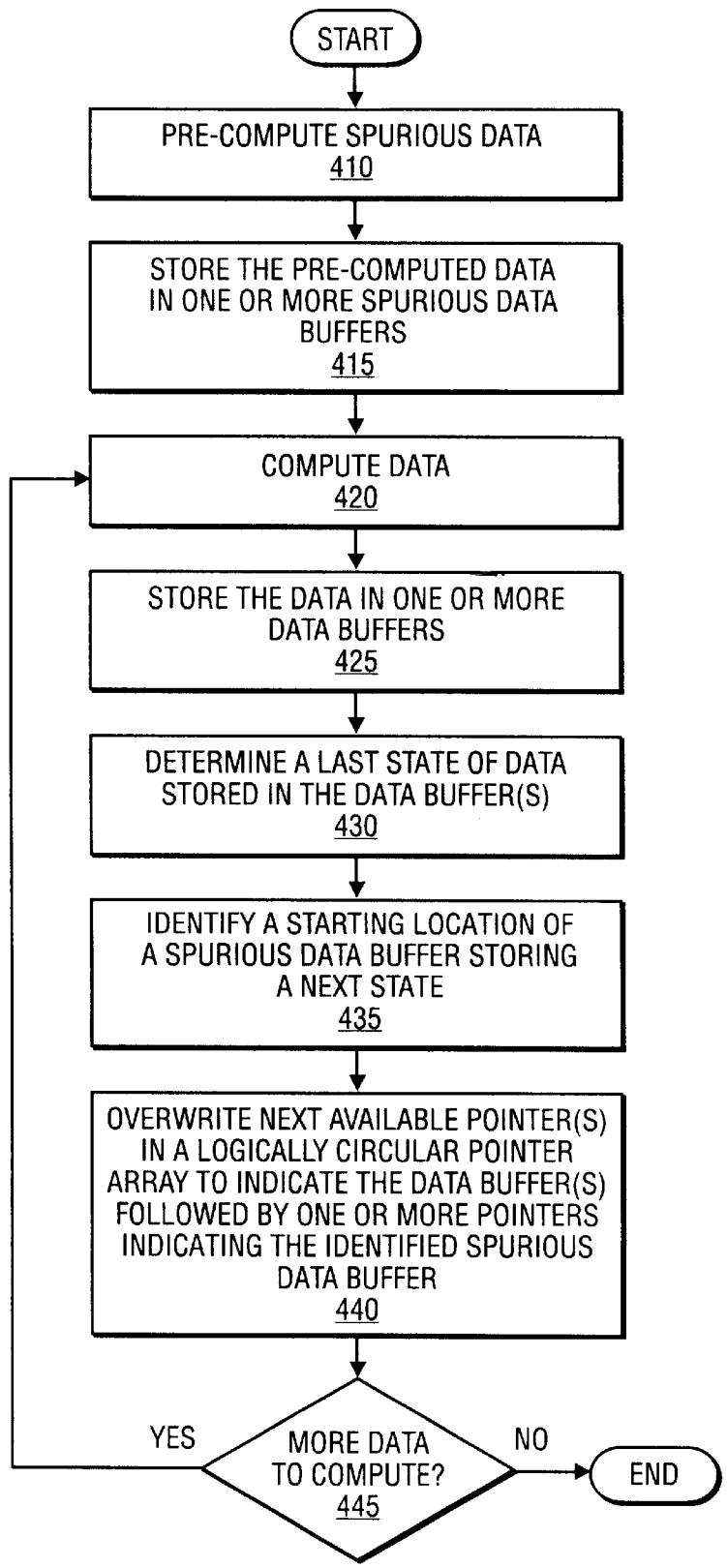
FIG. 4 demonstrates one embodiment of the present invention.

FIG. 4 demonstrates one embodiment of the present invention. In block 410, spurious data is pre-computed. For instance, when modems first establish communications, they go through a training cycle. During the training cycle, the modems agree upon a transfer rate, a multi-phased encoding cycle, error checking criteria, and so on. Then, the host processor generates the spurious data according to the conditions agreed upon during the training cycle.

Depending on the type of real-time processing, the spurious data may be any data that is suitable to sustain at least a degraded mode of operation. For instance, as discussed above for modems, the spurious data may be HDLC flags indicating no data, or the spurious data may be all zeros or all ones or any other pattern that will appear to be line noise to a receiving modem. Any form of spurious data that can be seamlessly inserted into a stream of real data and prevent failures due to unavailability can be used.

In block 415, the spurious data is stored in one or more spurious data buffers. For instance, as discussed above, several buffers may be generated for different encoding phases, different lengths of buffers, etc. Different spurious buffers, or sets of spurious buffers may also be generated for different transfer rates. For instance, some modems can switch among a variety of transfer rates during a single call depending on variations in line quality over time. In which case, different spurious data buffers may be needed for different transfer rates.

In the illustrated embodiment, the spurious data is pre-computed and stored throughout the duration of a modem call. In alternate embodiments, depending on the available processing power of the data source and/or available memory, spurious data may be generated dynamically, or "on the fly." For instance, rather than generating sets of spurious data buffers for each possible transfer rate that may be used during a modem call, only one set of spurious data buffers is stored for a current transfer rate. Then, when and if the transfer rate changes, a new set of spurious data is generated on the fly for the new transfer rate. Alternately, spurious data may be generated on the fly every time the pointer array is updated (see block 440 below). For instance, if there are hundreds or thousands of possible last states for which different spurious data buffers are needed, an optimal balance between memory requirements and processing power may require spurious data to be generated on the fly rather than storing the entire set of spurious buffers.

In block 420, data is generated. For instance, in a software modem as discussed above with reference to FIG. 6, the host system may generate data consisting of modulation samples that are to be rendered as an analog signal for transmission to a remote modem. The data source, that is, the host system, is non-real-time, meaning that the latency period for the generation of the next data (set of modulation samples) may be longer than the period of time that the dedicated modem hardware (i.e. the D/A converter and associated hardware) takes to consume a buffer of data. That is, the source of the data cannot be relied upon to provide the data when the data is needed for real-time data processing.

In block 425, the data is stored in one or more data buffers. For instance, a host processor may generate data sporadically. That is, during one burst of data generation, the host processor may generate 10 milliseconds worth of real-time data, and during the next burst only generate 3 milliseconds worth of real-time data. If data buffers are variable in length, a host processor may store all of the data from a given burst of processing to a single data buffer. Alternately, if buffer lengths are fixed, the host processor may only generate a fixed amount of data in any given burst of processing, or the host processor may store the data to multiple data buffers.

In block 430, the host processor determines a last state of data stored in the data buffer(s). The last state is recognized so that a spurious data buffer can be identified in block 435 that starts with data that will allow real-time processing to continue. For instance, as discussed above for modem communications, the last state, or phase in the multi-phase encoding cycle, is recognized so that a spurious data buffer can be selected that will start with the next state, or phase of the multi-phase encoding cycle. In alternate embodiments, a last state may include a transfer rate, a sample size, a data pattern, etc.

In block 435, a starting location of a spurious data buffer is identified based on the last state of the data stored in the data buffers. In alternate embodiments, as discussed above, a spurious data buffer may also be selected based on other criteria, such as length or duration, transfer rate, etc. As illustrated in the above embodiments, the starting location may be a first data sample in one of a set of spurious data buffers, each buffer specifically generated for a particular state, or the starting location may be one of a group of data samples within a single spurious data buffer, each sample corresponding to a particular state.

In alternate embodiments, multiple starting locations may be identified for a series of spurious data buffers, for instance, of differing lengths or containing different forms of data. For instance, a series of spurious data buffers may begin with several short buffers and progress to longer buffers. In which case, if the host processor is late by only a short period of time, only a small amount of spurious data is consumed, but enough spurious data is on hand for progressively longer delays.

In block 440, a pointer array is updated to indicate the data buffer(s) followed by the spurious buffer(s). In the illustrated embodiment, the pointer array is a logical circular buffer so that updating the pointer array involves overwriting previously existing, and already used, pointers. As discussed above, any number of techniques can be used to identify which pointers in the pointer array should be overwritten.

In block 445, if more data is to be computed, the process returns to block 420. Otherwise the process ends.

Returning to FIG. 1, as discussed above, FIG. 1 is intended to represent a broad category of computer systems including but not limited to those available from Intel Corporation of Santa Clara, Calif. In FIG. 1, processor 110 includes one or more microprocessors. In alternate embodiments, processor 110 may be coupled to temporary memory, permanent memory, various input/output devices, including a display device, keyboard, mouse, etc. In certain embodiments, one or more components may be eliminated, combined, and/or rearranged. A number of additional components may also be included in system 100, such as another bus bridge to another bus, one or more disk drives, a network interface, additional audio/video interfaces, additional memory units, additional processor units, etc.

Figure 5:
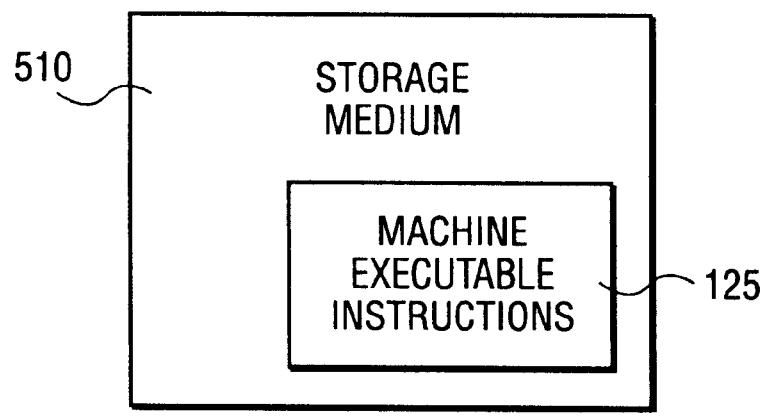
FIG. 5 illustrates one embodiment of machine executable instructions stored on a machine readable storage medium according to the teachings of the present invention.

The functions of the present invention can be embodied as a series or sequence of machine executable instructions 129 stored, for instance, in memory 125 and executed by processor 110. Alternately, as shown in FIG. 5, machine executable instructions 125, representing the function of the present invention, could be stored on distribution storage medium 510, such as a CD ROM, a digital video or versatile disk (DVD), or a magnetic storage medium like a floppy disk or tape. The instructions could also be downloaded from a local or remote network server.

Alternately, the present invention could be implemented in any number of additional hardware machines in which a non-real-time data source provides data for real-time data processing. For instance, one or more ASICs (application specific integrated circuits) could be endowed with some or all of the functionality of the present invention, and inserted into system 100 of FIG. 1 as separate components, or combined with one or more other components.

Thus, a method and apparatus to protect against failures due to data unavailability in real-time data processing is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   determining a last state of data stored in a first output buffer, the data having been generated in non-real-time for use in real-time data processing;
   updating a first pointer to point to a first location of a first spurious data buffer based at least in part on the last state of the data stored in the first output buffer, the first spurious data buffer containing spurious data to continue the real-time data processing;
   pre-computing spurious data; and
   storing the spurious data in the first spurious data buffer.

2. The method of claim 1 further comprising:
   overwriting the first pointer to point to a location of a second output buffer;
   determining a last state of data stored in the second output buffer; and
   updating a second pointer to point to a starting location of a second spurious data buffer based at least in part on the last state of the data stored in the second output buffer.

3. The method of claim 2 wherein the first and second spurious data buffers comprise overlapping sets of spurious data having different starting locations.

4. The method of claim 1 further comprising:
   updating a second pointer to point to a starting location of a second spurious data buffer based at least in part on at least one of the last state of the data stored in the first output buffer and a last state of spurious data stored in the first spurious data buffer.

5. The method of claim 4 wherein the first spurious data buffer has a first particular length and the second spurious data buffer has a second particular length that is longer than the first particular length.

6. The method of claim 1 wherein the data stored in the first output buffer comprises data generated by a host system for at least one of a synchronous and an isochronous transmission to a remote device, and wherein a maximum response latency of the host system exceeds a period of the transmission.

7. The method of claim 1 wherein:
determining the last state of the data stored in the first output buffer comprises identifying one of a plurality of sequential encoding phases; and
updating the first pointer comprises identifying a starting location for the first spurious data buffer that stores spurious data in a next one of the plurality of sequential encoding phases and writing the location for the first spurious data buffer to the first pointer.

8. The method of claim 1 wherein the first spurious data buffer has a predetermined length so that a last state of the data stored in the first spurious data buffer is equivalent to the last state of the data stored in the first output buffer.

9. The method of claim 1 further comprising:
updating a data pointer to point to a starting location of the first output buffer, and wherein the data pointer and the first pointer comprise a circular buffer of pointers.

10. The method of claim 1 wherein pre-computing the spurious data comprises dynamically generating the spurious data.

11. The method of claim 1 wherein the spurious data is suitable for a device-specific degraded mode of the real-time data processing.

12. The method of claim 1 wherein the data stored in the first output buffer comprises modulated data samples generated by a host-based modem to be transmitted to a remote modem.

13. The method of claim 12 wherein the spurious data is to appear as line noise to the remote modem.

14. The method of claim 12 wherein the spurious data comprises high-level data link control (HDLC) flags to indicate no data is being sent.

15. The method of claim 1 further comprising:
identifying a transfer rate for the data stored in the first output buffer, and wherein updating the first pointer is further based at least in part on the transfer rate.

16. The method of claim 15 wherein the first spurious data buffer comprises one of a plurality of buffers corresponding to a plurality of possible transfer rates.

17. The method of claim 1, further comprising:
providing to a device a data pointer to a starting location of the data stored in the first output buffer, the device to consume the data indicated by the data pointer; and
providing the first pointer to the device, the device to consume the data indicated by the first pointer.

18. An apparatus comprising:
first circuitry to determine a last state of data stored in a first output buffer, the data having been generated in non-real-time for use in real-time data processing;
second circuitry to update a first pointer to point to a starting location of a first spurious data buffer based at least in part on the last state of the data stored in the first output buffer, the first spurious data buffer containing spurious data to continue the real-time data processing third circuitry to pre-compute spurious date and store the spurious date in the first spurious data buffer.

19. A computer system comprising:

a bus;

a host processor coupled to the bus;

a memory coupled to the bus; and a device coupled to the bus, the device to perform real-time data processing;

said host processor comprising
first circuitry to determine a last state of data stored in a first output buffer in the memory, the data having been generated and/or stored in non-real-time by the host processor for use in the real-time data processing of the device, and
second circuitry to update a first pointer stored in the memory, the first pointer to point to a starting location of a first spurious data buffer stored in the memory based at least in part on the last state of the data stored in the first output buffer, the first spurious data buffer containing spurious data to continue the real-time data processing.

20. An article of manufacture comprising:

a machine readable storage medium; and the machine readable storage medium having stored thereon a plurality of instructions that, when executed by a machine, implement a method comprising
determining a last state of data stored in a first output buffer, the data having been generated and/or stored in non-real-time for use in real-time data processing,
updating a first pointer to point to a starting location of a first spurious data buffer based at least in part on the last state of the data stored in the first output buffer, the first spurious data buffer containing spurious data to continue the real-time data processing;
pre-computing spurious data; and
storing the spurious data in the first spurious data buffer.

21. A method comprising:
determining a last state of data stored in a first output buffer, the data having been generated stored in non-real-time for use in real-time data processing; and
updating a first pointer to point to a starting location of a first spurious data buffer based at least in part on the last state of the data stored in the first output buffer, the first spurious data buffer containing spurious data to continue the real-time data processing, wherein the data stored in the first output buffer comprises modulated data samples generated by a host-based modem to be transmitted to a remote modem.

22. A method comprising:
determining a last state of data stored in a first output buffer, the data having been generated in non-real-time for use in real-time data processing;
updating a first pointer to point to a starting location of a first spurious data buffer based at least in part on the last state of the data stored in the first output buffer, the first spurious data buffer containing spurious data to continue the real-time data processing; and
identifying a transfer rate for the data stored in the first output buffer, and wherein updating the first pointer is further based at least in part on the transfer rate.

23. A method comprising:
determining a last state of data stored in a first output buffer, the data having been generated in non-real-time for use in real-time data processing;

updating a first pointer to point to a starting location of a first spurious data buffer based at least in part on the last state of the data stored in the first output buffer, the first spurious data buffer containing spurious data to continue the real-time data processing;

providing to a device a data pointer to a starting location of the data stored in the first output buffer, the device to consume the data indicated by the data pointer; and providing the first pointer to the device, the device to consume the data indicated by the first pointer.

24. An apparatus comprising:

first circuitry to determine a last state of data stored in a first output buffer, the data having been generated in non-real-time for use in real-time data processing;

second circuitry to update a first pointer to point to a starting location of a first spurious data buffer based at least in part on the last state of the data stored in the first output buffer, the first spurious data buffer containing spurious data to continue the real-time data processing, wherein the data stored in the first output buffer comprises modulated data samples generated by a host-based modem to be transmitted to a remote modem.

25. An apparatus comprising:

first circuitry to determine a last state of data stored in a first output buffer, the data having been generated in non-real-time for use in real-time data processing; and second circuitry to update a first pointer to point to a starting location of a first spurious data buffer based at least in part on the last state of the data stored in the first output buffer, the first spurious data buffer containing spurious data to continue the real-time data processing, wherein the second circuit further identifies a transfer rate for the data stored in the first output buffer, and updates the first pointer based at least in part on the transfer rate.

26. An apparatus comprising:

first circuitry to determine a last state of data stored in a first output buffer, the data having been generated in non-real-time for use in real-time data processing; and second circuitry to update a first pointer to point to a starting location of a first spurious data buffer based at least in part on the last state of the data stored in the first output buffer, the first spurious data buffer containing spurious data to continue the real-time data processing, wherein the second circuit further provides to a device a data pointer to a starting location of the data stored in the first output buffer, the device to consume the data indicated by the data pointer, and the second circuit further provides the first pointer to the device, the device to consume the data indicated by the first pointer.

\* \* \* \* \*

UNITED STATES PATENT AND TRADEMARK OFFICE
CERTIFICATE OF CORRECTION

PATENT NO.   : 6,490,676 B1
DATED        : December 3, 2002
INVENTOR(S)  : Cota-Robles It is certified that error appears in the above-identified patent and that said Letters Patent is hereby corrected as shown below:

Column 3,
Lines 61 and 62, delete "fall", insert -- full --.

Column 4,
Line 5, delete "fall", insert -- full --.

Signed and Sealed this

Fifteenth Day of June, 2004

JON W. DUDAS
*Acting Director of the United States Patent and Trademark Office*